J. JONSON.
APPARATUS FOR SEPARATING METALLIC FILINGS.
No. 46,005. Patented Jan. 24, 1865
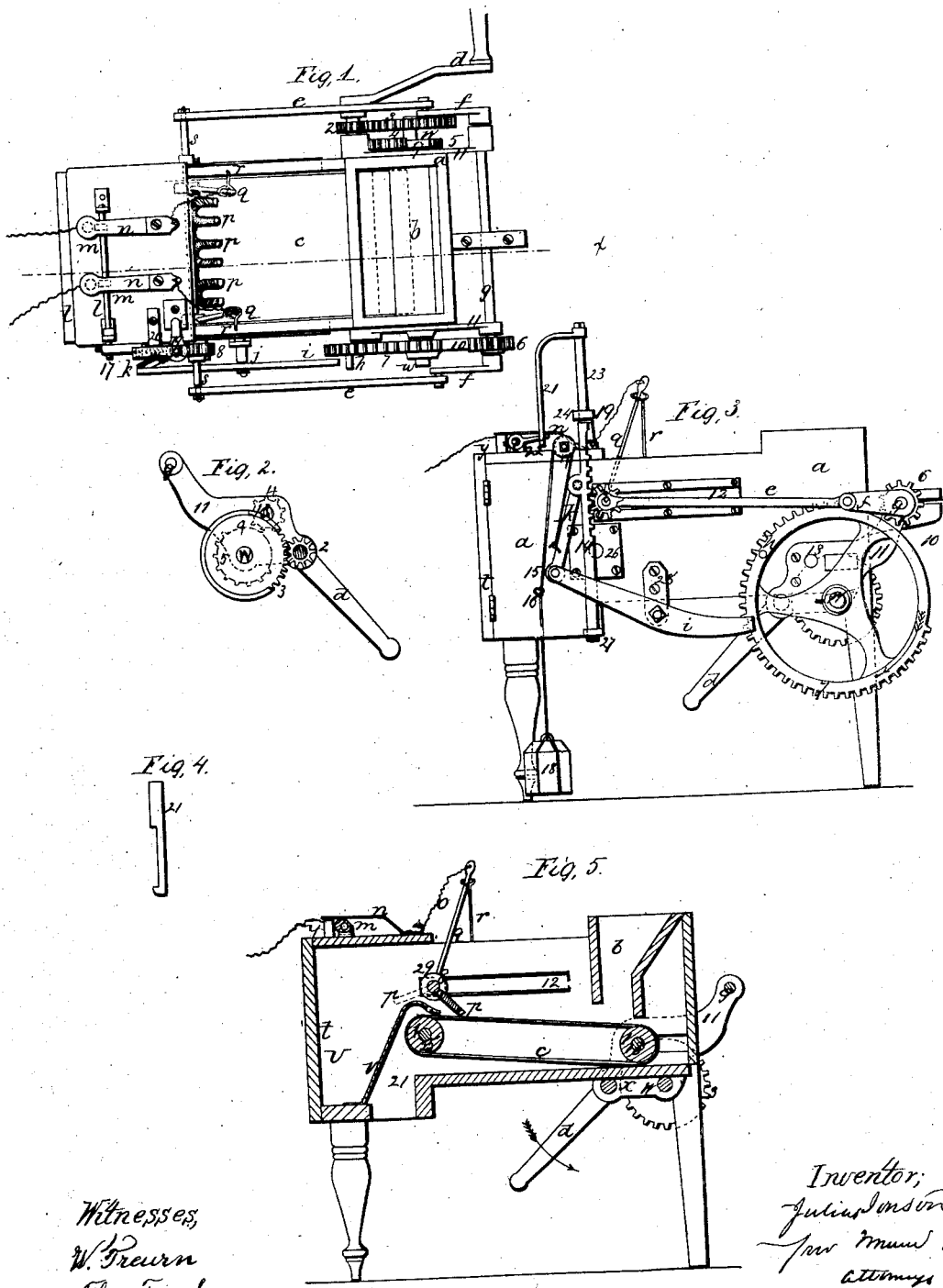

UNITED STATES PATENT OFFICE.

JULIUS JONSON, OF BALTIMORE, MARYLAND.

IMPROVED APPARATUS FOR SEPARATING METALLIC FILINGS.

Specification forming part of Letters Patent No. 46,005, dated January 24, 1865.

*To all whom it may concern:*

Be it known that I, JULIUS JONSON, of Baltimore, in the county of Baltimore and State of Maryland, have invented a new and useful Improvement in Machines for Separating Metallic Filings and other Fine Particles of Metal from each other; and I do hereby declare that the following is a full, clear, and exact description thereof, which will enable those skilled in the art to make and use the same, reference being had to the accompanying drawings, forming part of this specification, in which—

Figure 1 represents a plan of a machine made after my invention. Fig. 2 is a detailed view of the crank and its attachments. Fig. 3 is an elevation of the machine as seen on the side opposite to the crank. Fig. 4 is a detailed view of the notched arm 21. Fig. 5 is a sectional elevation of the machine, taken on the line $x$ of Fig. 1.

Similar letters of reference indicate corresponding parts.

In machine-shops and factories where brass, steel, iron, and other metals are wrought upon the brass filings and chips become mixed with the filings and chips of other metals, and the object of this invention is the separation of the iron and steel filings and chips from those of brass by means of magnets, which are made to traverse the mass and afterward to deliver the particles of metal which have been attracted to them into a separate receptacle, the electrical circuit being alternately broken and restored at the proper times automatically, and the mass of filings being exposed to the action of the magnets by means of a traveling apron upon which they are fed.

$a$ represents the body or frame of a machine which illustrates my invention. The said frame is sustained upon suitable supports, and its general outline in this instance is that of a parallelogram, partly open at top, and its strength is to be sufficient to bear the shafts and other operating parts hereinafter mentioned. One end of the frame is closed by a hinged door, $t$, of equal size with that end, and the door, when shut, constitutes one side of a reservoir, U, formed in that end of the frame, the back wall of the said reservoir being an incline plane, V, which reaches from side to side of the frame and extends inward and upward over the adjacent end of a traveling apron, $c$, as shown in Fig. 5. The frame $a$ is covered over at that end which contains the reservoir U, and its cover is made to sustain the cam-shaft $l$ and several other parts of the apparatus. The other end of the frame contains a hopper, $b$, opening over a traveling apron, $c$, which occupies the whole breadth of the frame and much of its length. The apron is carried at an inclination upon rollers 1 1, whose shafts 13 and 25 are journaled, respectively, in metallic plates 11 and 26, fixed on the sides of the frame without. One of the plates, 11, is shown in Fig. 2. They are of sufficient size to furnish bearings for the crank-shaft $x$ and the main shaft W, and they also extend beyond the frame in the form of a bracket, for the purpose of forming bearings for the shaft $g$. All of these shafts reach across the entire frame. $d$ is the crank of the machine, whose shaft $x$ carries a gear-wheel, 2, which meshes with a gear-wheel, 3, on the shaft W, which, as well as the crank-shaft $x$, extends beyond the frame on that side, so as to allow room for another pair of gear-wheels, 4 and 5, between the gears 2 and 3 and the side of the frame. The gear-wheel 5 is carried upon the shaft W and the gear-wheel 4 upon the shaft 13. The latter gives motion to the traveling apron $c$. One-half of the periphery of the gear-wheel 5 is smooth. The shaft W carries on its opposite end a large gear-wheel, 7, a part, 10, of whose periphery is smooth. Its teeth mesh with the teeth of a pinion set on the shaft $g$, which has on each end a crank-arm, $f$, to a wrist on each of which connecting-rods $e$ are secured, which take hold of the ends of a rock-shaft, $s$, reaching across the frame $a$ and rocking in sliding bearings, (not seen,) which slide in horizontal slots 12, cut in either side of the frame. The slots 12 have suitable metallic casings, upon which the sliding bearings move.

The shaft $s$ carries a pinion, 8, near one of its ends and without the frame, which pinion at certain times is engaged by the teeth of a vertical rack, 14, which moves vertically within a guide, 27, on the lower part of the frame $a$, and within a guide, 19, formed on the end of a bracket secured on the top of the frame. The upper part, 23, of the rack carries a dog, 21. (Seen in front view in Fig. 4.) The dog 21 is notched, as shown, to enable it to raise and depress alternately an arm, 22, projecting from the adjacent end of the rock-shaft $l$, which rocks in bearings on the cover of the frame $a$. The shaft $l$ carries two cams, $m$, which are so placed thereon as to lie beneath spring conducting-bars $n\ n$, secured to the wooden cover of the frame $a$. The free ends of these bars rest upon the tops of posts $y\ y$, also secured to the top of the frame, near the rock-shaft, and which posts receive conducting-wires (seen in red outline) leading from a battery, (not shown.)

The electrical circuit is completed by means of the spring-bars $n$, the conducting-wires $o\ o$ and posts $q\ q$, the said posts being secured to collars 29, which are fitted to the rock-shaft $s$ in such a manner as that they may have rotary, but not endwise, motion thereon. The upper ends of the posts are passed through eyes made in the standards $r$, so that their upper ends, to which the conducting-wires $o$ are connected, are held in nearly the same position while the lower parts of the posts are carried back and forth with the shaft $s$. A series of powerful magnets is connected to the shaft, and their positions thereon are such that while the rock-shaft is moving back and forth over the traveling apron, as hereinafter explained, their ends shall extend forward and downward, as seen in Fig. 5, close to the surface of the apron, so as to pass through the mass of mixed filings, with which the apron will be covered during the operation of the machine.

$i$ is a lever whose fulcrum is placed in the lower edge of a bracket, 28. It is connected at one end to the rack 14 by means of a connecting-rod, K, which is free to rotate about its joint-pins. A weight, 18, is suspended from the connecting-rod K by means of a cord, 15, which passes over a pulley, 17, and through a guide, 16. The weight tends to keep the rack elevated, as seen in Fig. 3. A pin, $h$, fastened on the side of the wheel 7 next to the vibrating arm $i$, strikes the arm at every revolution and raises it, thereby depressing the rack. When the revolution of the wheel 7 has carried the pin $h$ past the arm the weight restores the rack to its elevated position.

The operation of the machine is as follows: The electrical circuit having been established through the magnets $p$, the dirty brass filings which are to be cleaned from iron and steel chips and filings are passed to the traveling apron $c$ through the hopper. Motion being now given to the crank, the traveling apron is caused to move and carry a layer of filings toward its inner end. When the smooth part 9 of the gear 5 comes round opposite the pinion 4 the movement of the traveling apron ceases and it remains stationary during the next half-revolution of the shaft W. The large gear-wheel 7 gives motion to the wheel 6 and its shaft $g$, and thereby causes the shaft $s$ to traverse back and forth along the ways 12, carrying the magnets through the mixed mass of brass and iron chips and filings, the magnetism induced by the magnets causing the iron and steel to adhere to the magnets, and thus separating them from the brass. This process is continued until the smooth part 10 of the large gear comes opposite the gear 6, when the revolution of the shaft $g$ and its crank $f$ ceases, at which time, if the parts are properly adjusted, the shaft $s$ will be in its farthest position toward the left, so that its pinion 8 shall engage with the teeth of the rack 14, and the pin $h$ will at the same instant strike the under side of the lever $i$ and carry it upward, thereby depressing the other end of the lever and causing the rack to descend. The rack in its descent will rotate the pinion 8 and its shaft $s$, thereby causing the magnets, with their load of steel and iron filings and chips, to take the position shown in red in Fig. 5, at which time, also, the notched bar 21 will have depressed the arm 22 of the rock-shaft $l$ and raised the spring-bars $n\ n$ off the posts $y\ y$ by means of the cams $m\ m$, thus breaking the circuit, when the magnets $p$ will drop their load, which falls into the receptacle U, from whence they are removed through the door $t$. When the pin $h$ strikes the lever $i$ and the magnets are raised off the apron $o$ the gear 5 becomes engaged with the gear 4, and the apron begins again to travel onward, carrying its load, now freed of iron and steel chips, beneath the upper end of the inclined partition V and delivering it through the throat 21 on the floor or into a receptacle below the frame. So soon as the lever $i$ is released from the pin $h$ the weight 18 restores the rack to its first position, the rack in its upward return movement revolving the shaft $s$ in a contrary direction and returning the magnets to their position near the surface of the apron, while the lower notch of the notched bar 21, striking the arm 22, rocks the shaft $l$ and allows the spring-bars $n$ again to rest upon their posts $y$, thus restoring the circuit and remagnetizing the magnets $p$. The apron meanwhile has advanced far enough to expose a fresh bed of filings to the action of the magnets, which resume their movement over the apron so soon as the teeth of the gear 7 engage the gear 6. These operations are continued until the filings have all been fed to the machine, and if they are not sufficiently cleaned by one passage through it they can be put through it again and as often as is necessary.

The magnets $p$ are to be made in the ordinary way, and the conducting-wires and other devices which complete the electrical circuit are to be so made and arranged as to transmit the currents of electricity through the magnets according to the methods usually followed in electro-magnetic instruments, having due regard also to the conducting and non-conducting qualities of the materials used in the other parts of the machine.

I claim as new and desire to secure by Letters Patent—

1. The combination of temporary magnets fixed upon a shaft which is made to traverse back and forth, as described, with a travelling apron for carrying the filings to be cleaned, substantially as above set forth.

2. Breaking and re-establishing the circuit between an electrical battery and a series of temporary magnets automatically by means of the cams $m$, the vertical rack, and the lever $i$, under a mode of operation substantially such as and for the purpose above described.

3. In combination with the aforesaid lever $i'$, rack 14, and temporary magnets $p$, the separate reservoir U and inclined partition V, for the reception of the iron and steel filings, as explained.

4. The sliding rock-shaft $s$, the connecting-rods $e$, cranks $f$, and shaft $g$, in combination with the gear-wheel 7, substantially as described.

5. The combination of the segment-gear wheel 5, pinion 3, and shaft 13, for imparting intermittent rotation to the apron $c$, as explained.

6. Operating the rack by means of the lever $i$ and the pin $h$ on the wheel 7, substantially as described.

J. JONSON.

Witnesses:
LEWIS B. TEBBETTS,
E. G. DAVIS.